(12) United States Patent
Weber et al.

(10) Patent No.: US 7,548,962 B2
(45) Date of Patent: Jun. 16, 2009

(54) INTERNET MULTIMEDIA ADVERTISEMENT INSERTION SYSTEM SELECTION ARCHITECTURE

(75) Inventors: Barry Jay Weber, Carmel, IN (US); Kerry Wayne Calvert, Indianapolis, IN (US)

(73) Assignee: Thomson Licensing, Boulogne-Billancourt (FR)

( * ) Notice: Subject to any disclaimer, the term of this patent is extended or adjusted under 35 U.S.C. 154(b) by 775 days.

(21) Appl. No.: 10/381,860

(22) PCT Filed: Sep. 28, 2001

(86) PCT No.: PCT/US01/30547

§ 371 (c)(1),
(2), (4) Date: Mar. 28, 2003

(87) PCT Pub. No.: WO02/27622

PCT Pub. Date: Apr. 4, 2002

(65) Prior Publication Data

US 2004/0093394 A1 May 13, 2004

Related U.S. Application Data

(60) Provisional application No. 60/236,611, filed on Sep. 29, 2000.

(51) Int. Cl.
*G06F 15/16* (2006.01)
(52) U.S. Cl. .................. 709/219; 719/311; 725/32; 725/35
(58) Field of Classification Search ............. 725/32–35, 725/116, 36; 709/219, 224, 223; 348/722; 719/310, 311
See application file for complete search history.

(56) References Cited

U.S. PATENT DOCUMENTS 5,630,204 A * 5/1997 Hylton et al. ............... 725/116
5,715,018 A * 2/1998 Fasciano et al. ............ 348/722

(Continued)

FOREIGN PATENT DOCUMENTS

WO  WO 99/63698 A2  12/1999

OTHER PUBLICATIONS

R.L. Carter, Et al., "Server Selection Using Dynamic Path Characterization in Wide-Area Networks", IEEE, XP010251929, ISBN: 0-8186-7780, Computer Science Department, Boston University, Boston, MA, May 1997.

(Continued)

*Primary Examiner*—Van H Nguyen
(74) *Attorney, Agent, or Firm*—Robert D. Shedd; Harvey D. Fried; Joel M. Fogelson

(57) ABSTRACT

Architecture is provided for selecting an ad insertion system/server from a plurality of ad insertion systems/server for receiving broadcast transmissions and inserted advertisements. A gateway, as part of the architecture, selects an ad insertion system, in accordance with a developed client profile and a network factor associated with the communication performance of the ad insertion system. The gateway associates the developed profile with a client, and the gateway receives information relating the network factor from at least one ad insertion system. The gateway also ascertains the casting services (IP multicasting, IP multicasting proxy, and IP unicasting) supported by client. The ad insertion system may use the information about the supported casting services, with a developed client profile and a network factor for selecting an ad insertion system.

10 Claims, 6 Drawing Sheets

U.S. PATENT DOCUMENTS

| | | | | |
|---|---|---|---|---|
| 5,901,287 | A | | 5/1999 | Bull et al. ............. 395/200.48 |
| 5,918,014 | A | * | 6/1999 | Robinson .................... 709/219 |
| 5,995,943 | A | | 11/1999 | Bull et al. ..................... 705/14 |
| 6,119,163 | A | | 9/2000 | Monteiro et al. |
| 6,124,854 | A | * | 9/2000 | Sartain et al. ............... 715/716 |
| 6,173,322 | B1 | * | 1/2001 | Hu ............................. 709/224 |
| 6,385,592 | B1 | * | 5/2002 | Angles et al. ................. 705/14 |
| 6,487,538 | B1 | * | 11/2002 | Gupta et al. .................. 705/14 |
| 6,698,020 | B1 | * | 2/2004 | Zigmond et al. ............. 725/34 |
| 6,970,915 | B1 | * | 11/2005 | Partovi et al. ............... 709/217 |

OTHER PUBLICATIONS

Amit Gupta, et al., "Ad Insertion at Proxies to Improve Cache Hit Rates", Proceedings Of The 4th International Web Cachings Workshop, [Online] 1999, Retrieved from the Internet: URL:http://citeseerx.ist.psu.edu/viewdoc/versions?doi=10.1.1.41.3235<[retrieved on Jan. 12, 2009].

Ashutosh Dutta, et al., "MarconiNet - An Architecture for Internet Radio and TV Networks", Proceedings of NOSSDAV 1999, [Online] 1999, Basking Retrieved from the Internet: URL:http://citeseerx.ist.psu.edu/viewdoc/versions?doi=10.1.1.41.7604<[retrieved on Jan. 12, 2009].

IDMR, Inter-Domain Multicast Routing, "IGMP, Internet Group Multicast Protocol", Protocol suite: TCP/IP, Type: Transport layer multicasting protocol, URL:http://www.networksorcery.com/enp/protocol/igmp.htm<[retrieved on Jan. 24, 2009].

* cited by examiner

|   | ITEM | LENGTH | VALUE | REMARKS |
|---|---|---|---|---|
| 70 → | MARKER | 4 | LOGN | MARKS START OF LOGIN REQUEST |
| 72 → | BROADCASTER ID | 5 |  | CALL LETTER ID OF STATION |
| 74 → | VALIDATION | 32 | ENCRYPTED | ENCRYPTED VALUE THAT MUST DECODE AS VALID FOR THE CURRENT DATE/TIME, BROADCASTER ID, BROADCASTER PASSWORD |
| 76 → | MARKER | 4 | ELOG |  |

FIG. 4

|   | ITEM | LENGTH | VALUE | REMARKS |
|---|---|---|---|---|
| 90 → | MARKER | 4 | LOGN | MARKS START OF LOGIN REQUEST |
| 92 → | BROADCASTER ID | 5 |  | CALL LETTER ID OF STATION |
| 94 → | VALIDATION | 32 | ENCRYPTED | ENCRYPTED VALUE THAT MUST DECODE AS VALID FOR THE CURRENT DATE/TIME, BROADCASTER ID, BROADCASTER PASSWORD |
| 96 → | MARKER | 4 | ELOG |  |

FIG. 5

INTERNET MULTIMEDIA ADVERTISEMENT INSERTION SYSTEM SELECTION ARCHITECTURE

This application claims the benefit under 35 U.S.C. § 365 of International Application PCT/US01/30547 filed Sep. 28, 2001, which claims the benefit of U.S. Provisional Application No. 60/236,611, filed Sep. 29, 2000.

FIELD OF THE INVENTION

The present invention relates to the transmission of broadcast content over a network such as the Internet and, more particularly, to an architecture for selecting an ad insertion server for receiving broadcasts and inserted advertisements, in accordance with a developed profile and a network factor.

BACKGROUNG OF THE INVENTION

With a standard radio broadcast over AM/FM frequencies, the target audience is essentially determined by the program format and the geographic coverage of the radio station. Radio broadcasters typically determine the numbers and demographics of their listener base by using statistical sampling techniques that are collected by a third party organization. These statistics are referred to as Arbitron ratings. These ratings are crucial to the setting of advertising fees for the radio station, and are a major decision making tool for advertisers in determining where and how to place their advertisements.

However, advertisers prefer to direct their message to highly targeted listeners to increase the chance that the listener will act on the advertising message. With the Arbitron rating system, it is difficult for an advertiser to judge the effectiveness of their advertising campaign. This is because the advertiser and/or radio station simply cannot determine how many and what kind of people hear a specific advertising message with much accuracy.

Some radio stations now simulcast their programming via the Internet (i.e. Internet radio) either directly from their own web site, through an intermediary such as MUSIC-MATCH™, or another third party provider. Although the Internet medium can provide information about the listener back to the broadcaster, to date there is no implementation(s) that take advantage of the Internet medium in this manner.

An advantage to the broadcaster and its advertising clients to using the Internet is that the programming can reach people who are using a computer instead of a radio, such as people who are at work, who otherwise would not be listening to the radio. The Internet also allows people who are out of range of a conventional over-the-air broadcast signal, to be able to listen to broadcast programming.

A current disadvantage in distributing content through the Internet is that the advertising message may be completely out of context for a listener. This may occur when the listener is out of range of the over-the-air (i.e. AM/FM) broadcast signal. A person in New York, for example, listening to an Internet broadcast of a Houston radio station program, will not have an interest in advertising focused on the Houston location of the broadcaster. Hence, the value of increasing listenership via the Internet does not have the same financial benefit as increased listenership within the AM/FM broadcast range.

The above discussion is also applicable to any type of originally broadcast multimedia programming or main service that is being provided over the Internet, concurrently or not.

Thus, there is a need for providing Internet multimedia content that contains advertisements directed towards a particular listener.

As well, there is a need to provide Internet multimedia content simultaneously to a plurality of listeners.

Additionally, there is a need to offer and provide a plurality of stations of multimedia content via the Internet to a plurality of users, simultaneously.

SUMMARY OF THE INVENTION

The present invention is a system for processing and/or providing broadcast multimedia content and targeted advertisements to multiple users over a network, via an ad insertion system selected in accordance with a developed profile and a network factor.

The present invention provides the capability to connect a selected audience to an advertisement such that different people listening to and/or viewing the same broadcast program will hear unique advertisements. The invention also allows for the exact determination of how many listeners are tuned in to a broadcast, and can identify the demographics of the listener based on available information. This information provides the advertiser and radio broadcaster with an information base upon which to make decisions that are key to their operations and product offerings.

The present invention is particularly well suited for playback devices that do not have internal disk storage (such as radios, cell phones, etc). However, the present invention still works with personal computers (computers) and those devices that offer disk enabled playback systems. The present invention also supports devices capable of being bound to IP (Internet Protocol) unicasting, IP multicasting, and IP multicasting proxy broadcasts from a transmission source.

BRIEF DESCRIPTION OF THE DRAWINGS

Reference to the following description of the present invention should be taken in conjunction with the accompanying drawings, wherein:

FIG. 4 is a table showing login commands that a broadcaster sends to an aggregator program in order to forward program content for broadcast over the Internet in accordance the present invention;

FIG. 5 is a table showing login commands that a broadcaster sends to the aggregator program in order to forward advertisement mapping data in accordance with the present invention;

Corresponding reference characters indicate corresponding parts throughout the several views.

DETAILED DESCRIPTION OF THE INVENTION

Figure 1:
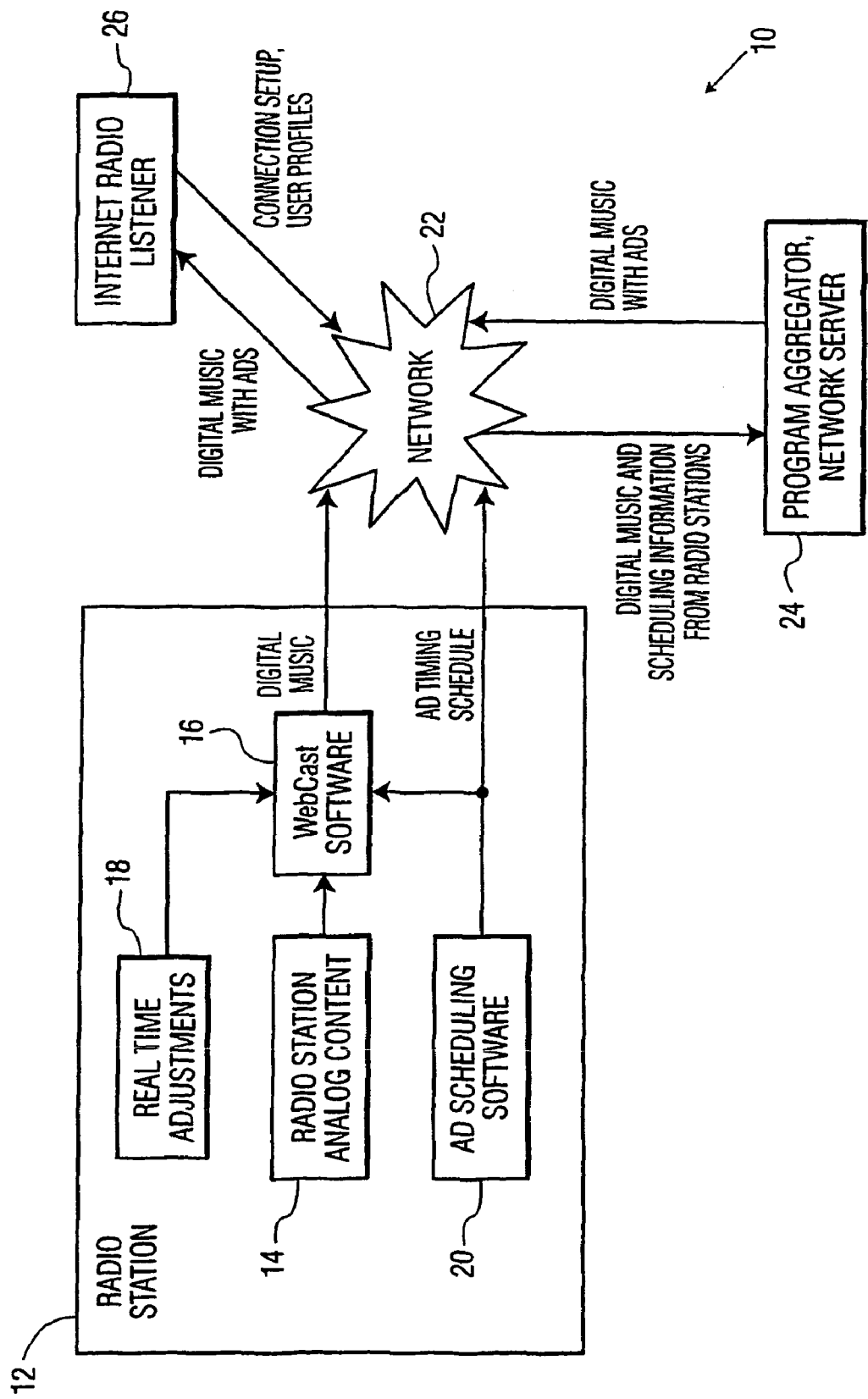
FIG. 1 is a block diagram of an Internet radio application illustrating one form of a multimedia broadcast.

With reference to FIG. 1, there is depicted a block diagram representation, generally designated 10, of a broadcast radio station network implementation and, more particularly, an Internet radio implementation of a broadcast radio station in accordance with the principles presented herein. It should therefore be initially understood that the broadcast radio station network implementation shown in the figures and described herein is only representative of a broadcast multimedia system or facility. As such, the principles presented herein with respect to broadcast radio (audio content, data, or programming) also apply to other broadcast multimedia.

Other broadcast multimedia includes, but is not limited to, streamed audio data, streamed video data, voice representative data, voicemail data, and video broadcast. A radio station 12 produces or generates analog programming or content 14.

The analog content 14 is in an audio analog format and is broadcast or transmitted over the air (i.e. terrestrial broadcasting) in an AM or FM format such as is known in the art. The radio station 12 may broadcast its content in digital form, but is typically in analog form. Terrestrial broadcasting of the radio station analog content 14 is received by standard radio receivers within the broadcast reception area as is known in the art. The radio station analog audio content (hereinafter "radio content") 14 contains programming (i.e. music and talk) interspersed with advertisements. The content of the advertisements is targeted for the listeners in the broadcast reception area.

Analogous to a radio station performing radio broadcasting, a television station produces or generates video and audio programming or content (i.e. television content). The content may be in an analog and/or digital format and is broadcast over the air (i.e. terrestrial broadcasting) in a format such as is known in the art. Such terrestrial broadcasting of the television content is received by television receivers within the broadcast reception area as is known in the art. The television station television content contains programming (i.e. video and audio) interspersed with advertisements. The content of the advertisements is targeted for the listeners in the broadcast reception area. Other forms of multimedia content may be broadcast in the same manner.

In addition to over the air broadcasting of the radio station analog content 14, the radio station 12 may provide the radio content 14 over a network 22. The network 22 is typically an electronic network and, more particularly, is typically the Internet. However, it should be appreciated that the present invention is applicable to any type of network or network system. In preparing the radio content 14 for dissemination over the network 22, the radio content 14 is appropriately formatted, as indicated by module 16. This may be accomplished via software such as WEBCAST™ software. Formatting 16 of the radio content 14 includes converting the analog signal into a digital signal for transmission to and via the network 22.

The radio station 12 also must provide a schedule of advertisements, module 20, for the radio content. This may be accomplished by advertising scheduling software. The advertisement scheduling software provides scheduling information or data to the formatting of the analog signal as well as providing an advertisement-timing schedule (advertisement mapping data) for additional dissemination over the network 22. The scheduling information is converted into markers or data that is contained within or formatted into the formatted analog signal in order to indicate when an advertisement should be inserted. The advertisement mapping data provides information regarding length of time (duration) for the advertisement, timing scheduling, and the like. Real time adjustments 18 are also provided to the formatting 16 of the analog signal if necessary, since delays may occur between the live broadcasting and the formatting/transmission of the analog signal for dissemination over the network 22.

After formatting 16 of the radio content 14, the now digital radio content is provided to the network 22. It should be additionally appreciated that the radio station 12 is representative of one of a plurality of radio stations that provide their over the air broadcast radio content to the network 22. Network server 24, which is in communication with the network 22, collects the digital radio content and advertisement scheduling data from all of the contributing radio stations 12. The network server 24 aggregates the radio content and advertisement scheduling data for dissemination over the network 22 to multiple listeners. Thus, the network server 24 becomes a provider of radio content of a variety of radio stations situated anywhere to anyone that has access to the network 22 and has the appropriate software.

A user or listener (client) 26 accesses the network 22 via appropriate means (such as a browser, a personal computer with a modem, set top box with a connection to the Internet, or an Internet enabled device with a network interface) and contacts and connects to the network server 24. The listener 26 selects a radio station/audio broadcast from a plurality of radio stations offered by the server 24. The network server 24 then provides the listener 26 the chosen radio station audio broadcast in real time via the network 22. The network-enabled device of the listener 26 also has appropriate software to play (decode) the audio format of the audio broadcast from the network server 24.

In accordance with an aspect of the present invention, the audio broadcast from the network server 24 includes advertisements that are targeted to the particular listener. The targeted advertisements are inserted in place of or where the advertisements would be in the original radio station broadcast. Thus, instead of hearing advertisements targeted to the listening audience of the place of origin of the radio station, the listener 26 hears advertisements that are specific or targeted to the particular listener. The advertisement timing schedule from the advertisement scheduling software 20 of the radio station 12 and timing information coded into the formatted radio content allow the network server 24 to accurately place targeted advertisements into the audio broadcast of the network server 24. The network server 24 then obtains the targeted advertisements. In order to be able to provide the targeted advertisements, it is necessary to obtain demographic information on the listener and reference the demographic information during the appropriate times of the audio transmission. As well, in accordance with an aspect of the present invention, the network server 24 is operable to provide each one of a plurality of listeners any one of the plurality of radio stations carried by the network server 24 as well as provide targeted advertisements in each radio station broadcast to each listener. These radio program streams are seamlessly provided to each user.

Figure 2:
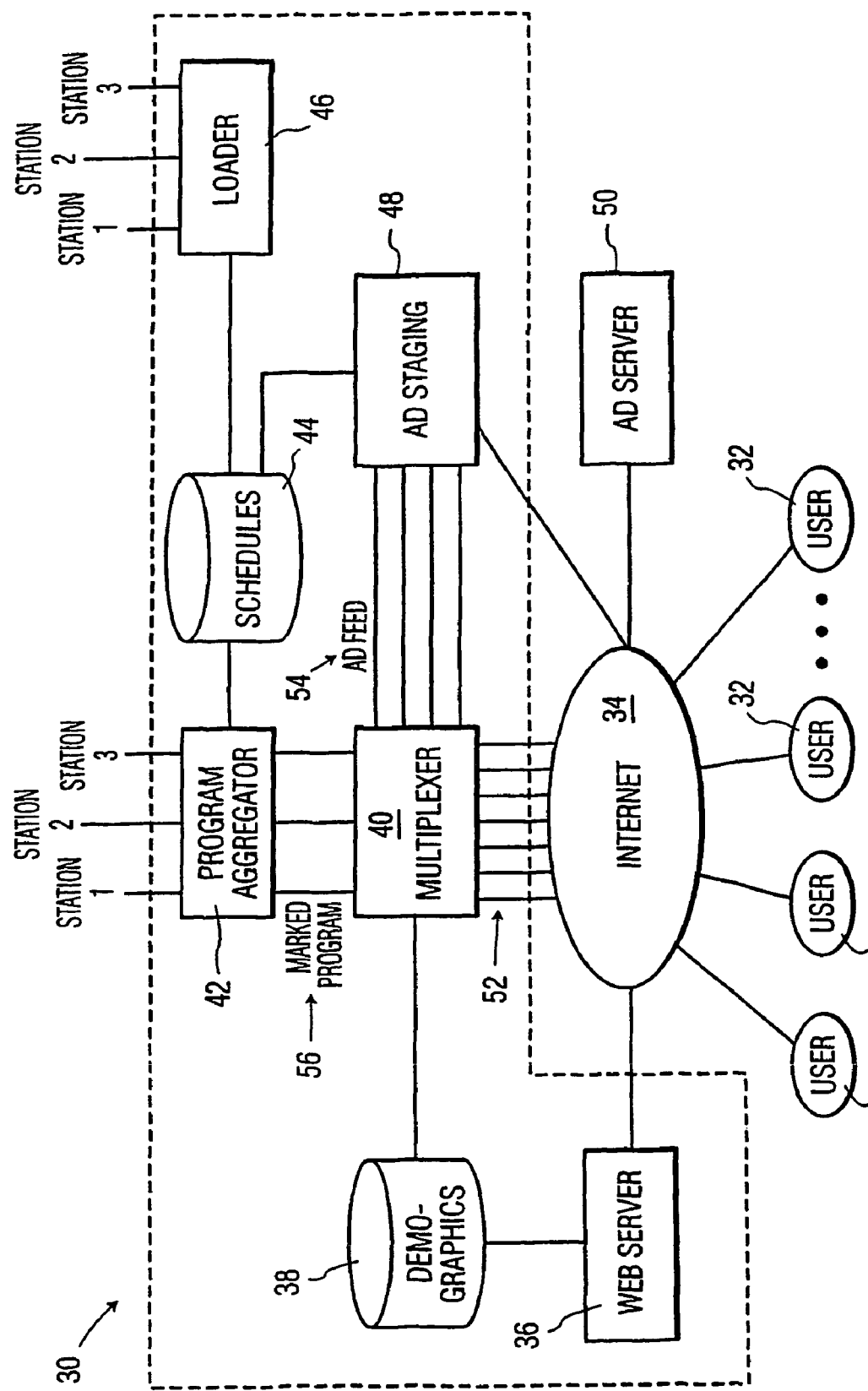
FIG. 2 is a block diagram the Internet radio application of FIG. 1 configured in accordance with the principles of the present invention.

Referring now to FIG. 2, a more detailed embodiment of the present invention is shown, generally designated 30. The system 30 is operable to provide any one of a plurality of multimedia feeds, content, programming, bitstreams, or the like to any one of a plurality of listeners or users 32. However, the system 30 will be described with respect to only one user 32 unless specifically indicated otherwise. While not specifically shown, it should be understood that the user 32 has and utilizes an Internet (network) enabled device that is operable to allow connection to and communication with the Internet 34. Consistent with the above, it should be appreciated that the term Internet encompasses any network system. Thus, an Internet enabled device is one that is compatible with the type of network in which the system 30 is used. Hereinafter, the term Internet will be used to denote any such network unless specifically indicated otherwise. The Internet enabled device may be a typical computer, such as a personal computer, a DSS system or the like (hereinafter, collectively "computer") having appropriate processing, memory, storage, logic or circuitry, and the like to access or connect to the Internet and contact and interface with the various servers in communication with the Internet. The Internet enabled device further includes appropriate software such as a browser program or the like. In addition to the browser program (communications interface), the Internet enabled device includes appropriate software or other means to receive, decode and play the audio (radio station) broadcast such as is known in the art.

The user 32 accesses the Internet 34 and thereafter connects with the radio station provider web server 36 (hereinafter "web server 36"). The user 32 interacts with the web server 36 to preferably set up a subscription account that includes the collection of demographics regarding the user 32. The web server 36 thus has appropriate software to obtain demographic information/data from the user 32. Preferably, such user demographics are then stored on the user's Internet enabled device for permanent storage, and cached in a demographics database (storage device) 38 associated with the web server 36 when the user 32 is connected to the web server 36. The subscription account, however, is not necessary for the operation of the present invention, but may offer the user 32 additional benefits.

In accordance with an aspect of the present invention, a web (Internet) agent program is installed on the Internet enabled device of the user 32. The web agent program may be downloaded from the web server 36 or other server, or provided on disk to the user 32 to install on the Internet enabled device. The web agent program is operable to track web sites visited by the user 36 when the user 36 is not listening to a radio broadcast from the web server 36. Web site information is used to supplement or populate the user's demographics. Internet enabled devices that may not accept a web agent or those that do not have storage capabilities may still connect to the web server 36 and listen to a radio broadcast. In these cases, user demographics are stored at the web server 36 such as in the demographics database 38.

When the user 32 connects to the web server 36 and selects or tunes to a particular radio station/broadcast, the user 32 is then connected to a multiplexer 40 through the Internet 34 via an IP socket connection or pipeline from the multiplexer 40. The multiplexer 40 is associated with either the web server 36 or another web server, and forwards the radio program contents from the selected radio station to the user 32. When advertisement data markers in the radio program content indicates that it is time for an advertisement to be inserted, the multiplexer 40 selects an advertisement channel or feed from a plurality of ad feeds 54 from an advertisement staging module 48 based on the demographic profile of the user 32, and connects the input source (i.e. radio program contents) to the appropriate advertisement channel.

In general, advertisement data markers are inserted by either the radio station 12 (i.e. the broadcast source) or the advertisement source and indicate when an advertisement is scheduled to be inserted into the program content as discussed above with reference to FIG. 1. This typically coincides with the advertisement schedule for the broadcast program content. Advertisement data as discussed above with reference to FIG. 1 is separately received by a loader 46 and added to the program content by a program aggregator 42.

The multiplexer 40 is operable to track the user connection and keep statistics in an advertising tracking database associated therewith. The statistics may include information such as how many users hear a particular advertisement. This statistical information is made available to the broadcasters dynamically through a web portal to assist the broadcaster and their clients in analyzing advertisement performance interactively. Interactive and time classified analysis of the listener base is highly valuable to both the broadcaster and the advertiser. For example, if the programming schedule assumptions regarding the type of listener were proving to be sub-optimal, the system supports the dynamic reconfiguration of the schedule and advertisement content. Ongoing analysis of listener trends allows the broadcaster to fine tune their programming content to fit their audience, and advertisers to align their messages as well. Thus, the system 30 is operable to dynamically reallocate advertisements targeted to a user 32 in response to the acquired statistics.

It is a benefit of the present invention that the advertisement is customized for a specific user 32. It should be appreciated that it is important for the present invention to support large numbers of connected users without degrading the continuity of the stream of data (radio program content and advertisements) to the user 32, otherwise the sound will be choppy and broken. This may translate to loss of listener attention or a complete loss of listener interest. Thus, staging of the program data, listener demographic caching, and the preparation of the advertising streams to support efficient interconnection to the multiplexer 40 is a key feature of the present invention. The advertisements may be locally sourced or non-locally sourced. Locally sourced advertisements are preferable over non-locally sourced advertisements. Further, the user profile database for demographics 38, preferably in conjunction with the statistics acquired by the multiplexer 40, is operable to allocate the different advertisements for delivery to the user 32 based on previously compiled user preference data. As well, prior preference data based on a user program selection history may be used.

The various radio stations (program content), designated by Station 1, Station 2, and Station 3 in FIG. 2, are received by a program aggregator 42. The Stations 1-3 are representative of the plurality of radio stations that forward their programming content for dissemination over the Internet 34. The program aggregator 42 may be associated with the web server 36, another web server associated with the multiplexer 40, or still another web server. Additionally, as indicated above with reference to FIG. 1, the programming content from the various radio stations, depicted as lines designated Stations 1-3, is provided to the program aggregator 42 typically via the Internet 34. This is not explicitly shown in FIG. 2 for simplicity, and since the programming content may be provided to the program aggregator by other means.

Data, as to advertising scheduling for the programming content from each of the stations providing programming content, depicted as lines designated Stations 1-3, is provided to a loader 46. Advertising schedule data may be received from a broadcast source of the radio content (e.g. radio station 12) or by a source of a designated advertisement (i.e. a targeted advertisement chosen for insertion into the radio content bitstream). The scheduling data may cover multiple radio station content and multimedia types. Further, the scheduling data preferably includes at least the following information: information indicating time slots available for advertisement insertion in the broadcast program; markers in the selected broadcast program indicating an advertisement insertion time slot; and information identifying advertisement insertion time slots from time stamp indications. Other scheduling data may be provided. Such advertising schedule data includes information as to when advertisements are scheduled in the program content (timing), the length of time for the advertisement, and any other pertinent advertisement data. The advertisement data is forwarded to a schedule database 44 (scheduler) that is in communication with the program aggregator 42. The program aggregator 42 then generates marked programming content that is forwarded to the multiplexer 40. The marked programming content includes the programming content from the radio station along with the advertisement data that allows the multiplexer 40 to determine when it is necessary to insert an advertisement.

When it is determined that an advertisement is to be inserted into the programming content/datastream provided to the user 32, the multiplexer 40 selects advertisement content via one of the plurality of ad feeds 54 according to the demographics information in the demographics database 38, the computer of the user 32, or a combination thereof. Each ad feed 54 originates at an advertisement staging module 48. The advertisement staging module 48 collects advertisements for sending to the multiplexer 40 via the ad feed lines 54. Collection of advertisements may be accomplished via the Internet 34 where an advertisement may be stored on an advertisement server 50 in communication with the Internet 34. Other means of providing an advertisement to the ad staging module 48 may be used such as via a tape. The advertisement staging module 48 may thus store various advertisements obtained in any manner as via the Internet 34 or in real time from the advertisement server 50. The advertisement staging module 48 is thus operable to provide a plurality of advertisements to the multiplexer 40 to support targeted advertisement placement into the appropriate programming content.

The multiplexer 40 thus forwards the appropriate radio station/programming content to the user, and when data markers in the programming content as received from the program aggregator 42 via one of the marked program lines 56, indicate that it is time for an advertisement insert, the multiplexer 40 selects an ad feed 54 based on the demographic profile of the user 32 and connects the user's input source to the appropriate advertisement feed. Because the present invention supports a plurality of users all connected to the multiplexer 40 with each pipeline of programming content allowing for the insertion of targeted advertisements, regardless of whether pipelines contain the same programming content, it is necessary for the multiplexer 40 to support the plurality of pipelines of programming content and the insertion of targeted advertisements in each of the pipelines. In accordance with an aspect of the present invention, the program aggregator 42, the schedule loader 46, advertisement stager 48, and the multiplexer 40 all act in concert to provide each user 32 with an individual listening experience. Each of these sections or modules will be described further below.

The program aggregator 42 is preferably a multi-threaded software program that provides a connection with each radio broadcaster system and thus receives respective radio broadcast programming from each of the radio broadcast systems. It should be appreciated that each radio broadcast program is provided in more or less real time to the program aggregator 42.

The program aggregator 42 is implemented as a login thread, a control thread, and a read thread and may be considered a condition access processor. The login thread provides a connection from the radio broadcaster to the program aggregator 42. The connection is preferably made over a secure IP link. The login thread listens for requests from the broadcaster. When the connection is made, the login thread expects to receive a login request record. The login request record is analyzed to ensure that the client connection request is actually a permissioned radio station. It is preferable that the IP link from the radio broadcaster to the program aggregator 42 is secured and encrypted such that radio piracy is avoided. Upon successful login, the login thread starts a read, write, and control threads, informing them of the identification (ID) of the broadcaster that has been connected.

FIG. 4 is a table, generally designated 60, showing one embodiment of login commands as sent by the radio broadcaster to the program aggregator 42 regarding the program content. Column 62 of the table 60 lists the login command items. Column 64 of the table 60 lists the login command bit length for the corresponding login command item from the login command item column 62. Column 66 of the table 60 lists the login value for the corresponding login item from the login command item column 62. Column 68 of the table 60 depicts remarks for the corresponding item from the login command item column 62. Row 70 of the table 60 shows that the item marker sent by the radio broadcaster, of bit length 4 and of a value LOGN, and received by the program aggregator 42 marks the start of a login request. Row 72 of the table 60 shows that the item broadcaster ID sent by the radio broadcaster, of bit length 5, and received by the program aggregator 42, presents the call letters identification of the particular radio station. Row 74 of the table 60 shows that the item validation, sent by the radio station, of bit length 32 and encrypted in accordance with an encryption routine, and received by the program aggregator 42, presents an encrypted value to the program aggregator 42 that must decode as valid for the current date/time, broadcaster ID, and broadcaster password. Lastly, row 76 of the table 60 shows that the item marker, sent by the radio broadcaster, of bit length 4 and a value of ELOG, and received by the program aggregator 42 stops receipt of the radio broadcast.

The control thread portion or module of the program aggregator 42 reads the schedule database 44 to determine the times that advertisement inserts are to take place in the broadcast program. A request to stage an advertisement for the next advertisement cycle is sent to the advertisement staging module or program 48. This request consists of a record that identifies each advertisement from the schedule that is required. The advertisement staging program/module 48 responds with a set of connection ports (ad feeds) that are available to read the advertisement content. The ports are then correlated to the demographic type by the control thread so that when it is time to start the advertisement, the core intelligence for associating a user 32 to an advertisement type is established.

A feature of the control thread is that the control thread ensures that all resources are classified and ready for use at the time that the advertisement is supposed/scheduled to run. Timing latency of finding the advertisement, staging the advertisement into memory, and allocating connection resources cannot be delayed to the time of need without interrupting the steady flow of music data (i.e. program content) to the user 32. The control thread will prepare a buffer that contains the mapping of a demographic advertisement to an advertisement stager port (ad feed) that is used by the multiplexer 40 to select advertisement content for a particular user 32. This buffer is transmitted to the read thread, which will place this thread in the multiplexer destined buffer stream when the start time arrives.

The read thread receives a data stream from the radio broadcaster, selecting valid encoded (such as by MP3 or the like) frames from the data and placing the valid frames in a memory queue that is then routed to the multiplexer 40. Each buffer of encoded frames is timestamped to mark its receipt from the broadcaster. The read thread stages the data received in memory to ensure the smooth flow of the data to the user 32. As well, the encoded frames are analyzed for integrity. Any bad frames are discarded to avoid sound degradation, typically caused by corrupted data. The read thread also reads a message buffer that contains the demographic ad/port mapping and determines the appropriate time to insert this message buffer in the multiplexer bound memory queue. The receipt of the message buffer by the multiplexer 40 is the signal to switch to advertising content instead of the broadcast data.

The programming schedule loader 46 receives programming schedule data from the radio broadcaster via a secure IP link connection. The schedule loader program opens a socket/pipeline (such as a TCP/IP socket) on a specific port id that has been assigned for a particular broadcaster. The schedule loader program runs continuously, servicing requests as they arrive. Upon receiving a connection request from the radio broadcaster, the loader 46 used the encrypted login protocol to validate the radio broadcaster, then processes requests from the radio broadcaster if validation succeeds. The requests consist of insert, update, and delete requests of scheduling records that are used to control the advertisement insertion into the program stream. The request is processed and the command record is then marked with the status of the operation, and the identifier of the record (when the command is an insert request). Thereafter, the command record is sent back to the radio broadcaster.

FIG. 5 is a table, generally designated 80, showing one embodiment of login commands as sent by the radio broadcaster to the loader 46 regarding advertisement mapping data. Column 82 of the table 80 lists the login command items. Column 84 of the table 80 lists the login command bit length for the corresponding login command item from the login command item column 82. Column 86 of the table 80 lists the login value for the corresponding login item from the login command item column 82. Column 88 of the table 80 depicts remarks for the corresponding item from the login command item column 82. Row 90 of the table 80 shows that the item marker sent by the radio broadcaster, of bit length 4 and of a value LOGN, and received by the loader 46 marks the start of a login request. Row 92 of the table 80 shows that the item broadcaster ID sent by the radio broadcaster, of bit length 5, and received by the loader 46, presents the call letters identification of the particular radio station. Row 94 of the table 80 shows that the item validation, sent by the radio station, of bit length 32 and encrypted in accordance with an encryption routine, and received by the loader 46, presents an encrypted value to the loader 46 that must decode as valid for the current date/time, broadcaster ID, and broadcaster password. Lastly, row 96 of the table 80 shows that the item marker, sent by the radio broadcaster, of bit length 4 and a value of ELOG, and received by the loader 46 stops receipt of the advertisement mapping data.

Figure 6:
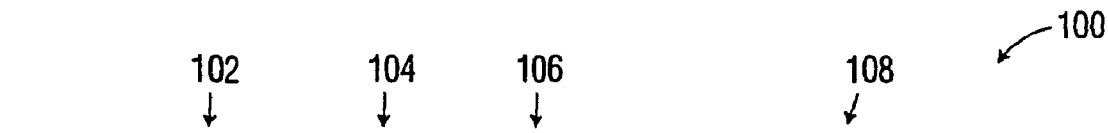
FIG. 6 is a table showing record maintenance commands that the broadcaster sends to the loader program regarding the forwarding of records of mapping data in accordance with the present invention.

FIG. 6 is a table generally designated 100, showing one embodiment of record maintenance commands as sent by the radio broadcaster to the loader 46 regarding records data. Column 102 of the table 100 lists the login command items. Column 104 of the table 100 lists the login command bit length for the corresponding login command item from the login command item column 102. Column 106 of the table 100 lists the login value for the corresponding login item from the login command item column 102. Column 108 of the table 100 depicts remarks for the corresponding item from the login command item column 102. Row 110 of the table 100 shows that the item marker sent by the radio broadcaster, of bit length 4 and of a value of DATA, and received by the loader 46 marks the start of a new command. Row 112 of the table 100 shows that the item broadcaster ID sent by the radio broadcaster, of bit length 5, and received by the loader 46, presents the call letters identification of the particular radio station. Row 114 of the table 100 shows the item command type, of bit length 1, a value of 1, 2, or 3, and received by the loader 46, indicates whether to insert, update, or delete a record. Row 116 of the table 100 shows the item record ID, of bit length 10, sent by the radio broadcaster and received by the loader 46, indicates the record identifier set by the schedule loader program that is returned on an insert command request. Row 118 of the table 100 shows the item start date, of bit length 10, having a value of DATA (i.e. MM/DD/YYYY), sent by the radio broadcaster and received by the loader 46, provides a date for advertisement insertion. Row 120 of the table 100 shows the item time, of byte length 11, having a value of TIME (i.e. HH:MM:SS:SS), sent by the radio broadcaster and received by the loader 46, provides a time for advertisement insertion. Row 122 of the table 100 shows the item ad identifier, of bit length 20, sent by the radio broadcaster and received by the loader 46, provides a record identifier for advertisement media located on an advertisement server. Row 124 of the table 100 shows the item results, of bit length 1, having a value of 1 or 0, sent by the radio broadcaster and received by the loader 46, indicates whether the record has failed or passed. Row 126 of the table 100 shows the item marker, of bit length 3, having a value of DEND, sent by the broadcaster and received by the loader 46, indicates the end of the commands.

Advertisement staging is accomplished by the advertisement (ad) staging module 48 through appropriate software, hardware, or a combination of both. The advertisement staging 48 connects to an advertisement server 50 in order to obtain an advertisement for later insertion into the program content. The advertisement is cached in memory associated with the advertisement staging 48. Staging of the advertisements is driven by requests from the control thread. The control thread analyzes the schedule requirements, and notifies the ad staging 48 as to which advertisements are required for the next broadcast cycle so that the advertisement is ready at the required time. The advertisement is thus predictively staged. The advertisements are preferably cached since significant delays can occur when trying to retrieve an advertisement in real time, especially from Internet servers.

The system 30 includes an error processor to parse the composite datastream (i.e. radio station and advertisements) provided to the user 32 to detect errors. An error concealment function is operable to reduce the consequences of a detected error.

In accordance with an aspect of the present invention, the multiplexer 40 manages the connections with the users 32, switching between broadcast program and advertisement presentation for each pipeline or IP socket 52 (see FIG. 2). The multiplexer 40 can be configured to transport the broadcast to other nodes in the network that are running the present multiplexer program, i.e. scalability. This is depicted in FIG. 3.

Figure 3:
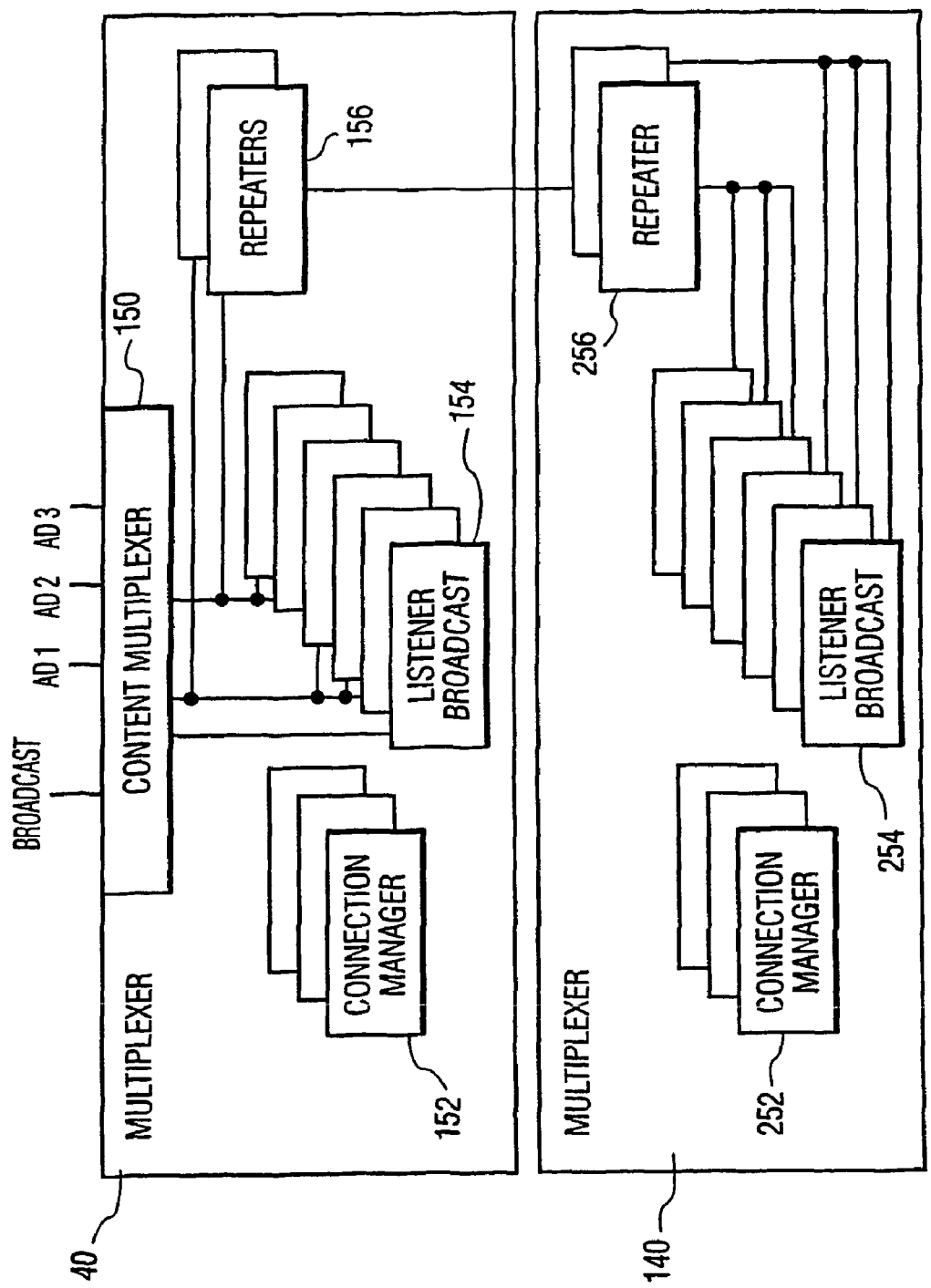
FIG. 3 is a block diagram of the functionality of the multiplexer of FIG. 2 in accordance with the principles of the present invention.

Referring now to FIG. 3, there is depicted a block diagram illustrating the scalability of the present invention it should be appreciated that the multiplexer 40 may be implemented in appropriate software, hardware, or a combination of software and hardware. In general, each box in FIG. 3 represents a processing thread that is managed within the multiplexer program. As discussed below, multiple multiplexer programs can be run on the same web server, or distributed across multiple servers. The determination of how this is configured is made optimally based on the capabilities of the web server and the operating system on which the multiplexer program is running. In FIG. 3, the multiplexer 40 is considered a main multiplexer, while the multiplexer 140 an auxiliary or supplemental multiplexer. The main multiplexer 40 is configured to support a content (radio broadcast and advertisements) multiplexer 150 that receives a radio broadcast, represented by the line labeled Broadcast, and advertisements, represented by the lines labeled Ad 1, Ad 2, and Ad 3 (targeted advertisements via the ad feeds of the ad staging module 43, see FIG. 2). It should be appreciated that the multiplexer labeled 40 in FIG. 2 supports the multiplexer architecture depicted in FIG. 3 and described below. Further, it should be appreciated that the present invention supports multiple auxiliary or supplemental multiplexers 140, even though only one such auxiliary or supplemental multiplexer 140 is shown in FIG. 3.

A connection request originates from the web server 36, which is the point of contact for users 32 that want to access a broadcast. The web server 36 attempts to connect to an active connection manager 152 of the plurality of connection managers represented by the multiple connection manager boxes. The active connection manager will change based on system load. The web server 36 is notified when the active connection manager changes. The connection manager 152 determines whether its server has adequate resources to support another user 32. If the connection manager 152 does have adequate resources to support another user 32, the connection manager 152 returns an IP address and port id to the web server, and a listener broadcast thread 154 (LBT) is started. The LBT waits for a connection to occur on the IP address and port id. When a connection occurs, the LBT streams the broadcast/add data it finds on the assigned input channel. The input channel is implemented as a memory queue that is created by the content multiplexer 150 or a repeater 156.

If the local machine does not have adequate resources to start an LBT, then the connection manager 152 passes the connection request to the next multiplexer (the auxiliary or supplemental multiplexer 140) in the configuration. If no multiplexers can support the request, the user is denied access. When the LBT is started, the web server 36 downloads a dynamic Java applet (or equivalent command instruction) to the web client that will then open a connection to the IP address and port received from the connection request. The Java applet will then start an MP3 (or other music decoder) player installed on the user's computer.

The content multiplexer 150 manages queue pointers that are used by the LBTs to select their MP3 data source. During the program broadcast, all LBTs are pointing at the same queue that contains the radio program. When the multiplexer 40 receives the advertisement start buffer, the multiplexer 40 resets the input pointers for the LBTs such that they receive data from the appropriate advertisement source. The content multiplexer 150 then resets a primary broadcast queue pointer to the appropriate buffer in the source broadcast by looking for the timestamp on the buffer that is closest to the advertisement start time plus the length of the advertisement (per the schedule). This resynchronizes the user 32 back to the appropriate start point in the broadcast.

The repeaters 156 on the main multiplexer 40 acts like a listener broadcast thread, except that instead of sending the stream to a listener, the stream is sent to a repeater 256 on another machine (multiplexer 140). The repeater 256 on the multiplexer 140 creates a memory queue that is transparently mapped to the LBTs. A repeater thread instance for every demographic type and every machine node in the network will be configured on the main multiplexer 40 instance. A repeater thread is started for every active demographic type on supporting nodes in the network, as connection requests require.

The present connection manager architecture as described above provides for scalability of system throughput because each user requesting connection to a broadcast can be allocated computing resources on a machine in the network where resources are available. As servers (processors and the like) are added to the configuration, the number of users that can be supported increases in direct proportion to the added hardware.

The present repeater architecture provides for the addition of servers in the network to support additional users without linearly increasing the demand on the network. This is accomplished by transmitting the aggregated program content for a specific demographic type to a server that, in turn, will transmit the broadcast to any number of listeners of that demographic type.

Each demographically aggregated program requires roughly 130 kbs of network bandwidth to maintain the broadcast quality. Around 750 unique program streams are supportable on a 100 baseT network. In practice, this is far greater than the likely number of unique advertisements per timeslice. As such, connecting multiple machines (in order to scale processing power for LBTs) does not present load challenges on the network A significant bottleneck may occur between the LBT and a network switch/router switch associated with the server to the Internet. If a given machine in the network were supporting 4000 listener connections, the output data stream bandwidth requires 500 Mbs of throughput. This bandwidth issue is easily solved, however, with currently available router and switching technology.

The point to point and steady stream nature of each connection to a user 32 allows for a server configuration that includes multiple network connections between a given server and a network router. Each network connection to the router is preferably on a dedicated physical link, so that all network capacity on the link is allocated to a set of LBTs.

A router/switch supports multiple connections to allow scaling of the load across the physical links. Current network router technology can operate at throughput rates of 1 Gpbs, so a router handles up to 10 (ten)100 baseT links. The router will preferably switch the load to the Internet via optical (e.g. SONET), DS4, or other interfaces. With optical network switching operating at 2.4 Gbs per channel, and DS4 at 254 Mbs, a solution simply requires configuring an adequate number of DS4/optical channels to enough routers to support the intended number of simultaneous listener connections.

Scalability is thus an aspect of the present invention since the viability of personalized broadcasting, as a business model, requires reaching large numbers of people. Accomplishing this mandates a system architecture that can distribute the workload across multiple computers/servers.

Figure 7:
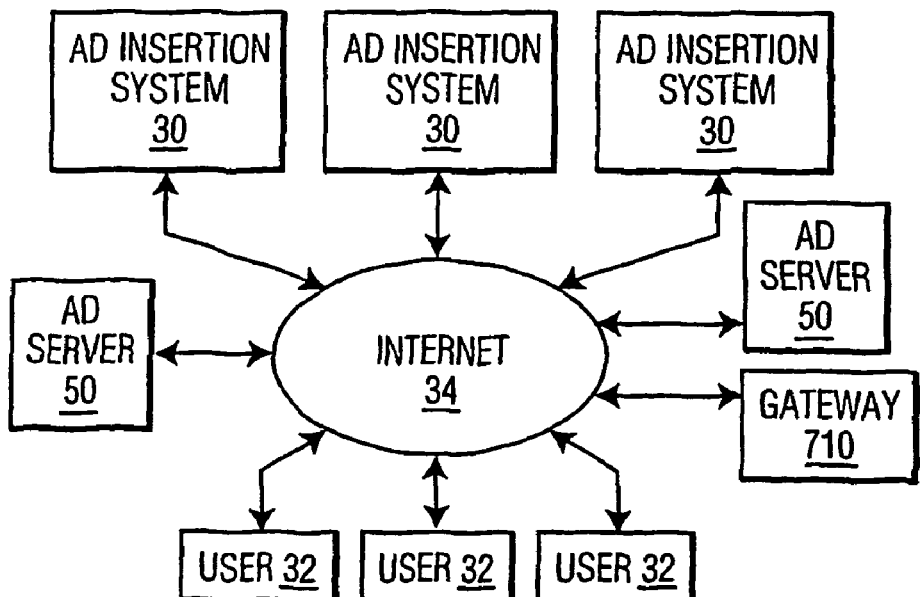
FIG. 7 is a block diagram of routing users to an ad insertion systems from a plurality of ad insertion systems in accordance with a developed profile and a network factor.

FIG. 7 displays a block diagram of assigning users to an ad insertion system, from a plurality of ad insertion systems, in accordance with a developed profile and a network factor. The described invention architecture scales ad insertion system/server 30 (from FIG. 2) into a plurality of ad insertion systems 30 for supporting a plurality of users 32 as clients and for increasing the efficiency of communicated bandwidth.

A user 32, as a client, logs into a gateway 710, through a network (Internet 34) using an IP address or a Universal Resource Indicator, for the purpose of receiving a broadcast (for example, streaming media audio broadcast from a radio station). Preferably, gateway 710 is a server (root server, domain name server (DNS), program server, web server 36, or other type of program/device) that supports clients, which routes a client such as user 32, to a destination on the Internet 34 supporting client services (for example, a streaming media broadcast). The gateway 710 optionally resides in an ad insertion system 30 from the plurality of ad insertion systems. Alternatively, the gateway 710 is a program, written in a browser complaint format (JAVA™, ACTIVEX™, SHOCK-WAVE™, HTML) that is transferred to and/or resides in the access means of user 32. The gateway 710, as a program, routes user 32 to a destination through Internet 34, supporting client services.

Gateway 710 identifies and associates a developed profile such as a demographic profile with user 32, preferably the demographic profile exists either in local or remote storage (refer to previous sections above about user identification, and the content of demographic profiles). Optionally, the gateway 710 allows for user 32 to update or create a demographic profile by entering in information (via questionnaire, text entry, etc.) and/or by using data generated by Internet usage analysis (profiles developed by third parties, tracking activity on websites visited, web site cookies analysis, or the like.). Gateway 710 analyzes the associated demographic profile of user 32 for determining at least one ad insertion system 30 from a plurality of ad insertion systems that corresponds with the demographic profile of user 32.

Ad insertion system 30, in this embodiment, is replicated into at least one system 30 from a plurality of systems, in manner consistent with use of repeaters 156 and 256, as displayed in FIG. 3. Alternatively, the replication of ad insertion system 30 begins with gateway 710 polling an ad insertion system 30 (first system 30) from a plurality of ad insertion systems (via a network connection as Internet 34), to determine content stored within the system 30 (for example, demographics 38, schedules 44, ad staging 48) and the available aggregated programming (Stations 1-3). Gateway 710 then communicates with at least one ad insertion system 30 (second system 30) from a plurality of ad insertion systems and transmits a duplicate copy of the content and available aggregated programming to the second system 30, effectively replicating first system 30. It is noted that ad insertion system 30 may be replicated as many times as needed, and the duplication of system 30 accommodates the duplication of other ad insertion systems with different content or available programming. Also, gateway 710 periodically polls and updates at least one ad insertion system 30 from the plurality of systems 30 for maintenance purposes (for example, to provide more broadcast programming selections, to update content as schedules 44 and ad staging 48).

While matching user 32 to at least one ad insertion system 30 of a plurality of ad insertion systems, gateway 710 determines (simultaneously or after matching a demographic profile to a user 32) at least one network factor from a plurality of network factors related to connecting to at least one ad insertion system 30. Specifically, a network factor is a metric used to measure the robustness of a communications network (Internet 34). For example, the gateway device 710 pings at least one ad insertion system 30 of a plurality of ad insertion systems and determines network congestion by amount of time (network latency time) it takes to receive a response to the ping request (the longer the time, the greater the congestion). Other network factors include physical distance to an ad insertion system 30, the amount of users 32 connected to an ad insertion system 30, responsiveness the same streaming media broadcast encoded at different playback speeds and/or bit rates, the amount of servers used to communicate a packet between gateway 710 and ad insertion system 30, and quantizing data dispersion (calculating the delay in buffering the playback of a streaming media broadcast). The network factors are determined by methods as table lookup, forward and/or back propagation techniques (information communicated by system 30 to gateway 710), and testing sample data. It is noted that the listed network factors are used for illustrative purposes with the list being non-exclusive, incorporating network factors that are not described but are consistent with this specification.

Gateway 710 compares at least one network factor from at least one ad insertion system 30 to determine which ad insertion system 30, from a plurality of ad insertion systems, should transmit programming to user 32. For example, gateway 710 determines that two ad insertion systems 30 correspond to the demographic profile of a user 32. The gateway 710 then compares at least one network factor corresponding to each ad insertion system 30, such as the gateway 710 determining that the data responsiveness (a network factor) of one ad insertion system 30 is faster than the other ad insertion system 30. The gateway 710 communicates with faster ad insertion system 30 to transmit programming to an IP address or Universal Resource Indicator (URI, such as a HTTP address) corresponding to user 32. Alternatively, the gateway 710 routes user 32 via Internet 34 to the faster ad insertion system 30 by use of IP addressing or redirection techniques (for example, directing user 32 to the IP address or URI of faster ad insertion system 30). User 32 receives available programming from faster ad insertion system 30, wherein ad insertion system 30 is periodically updated with advertisements from ad server 50, via Internet 34.

Figure 8:
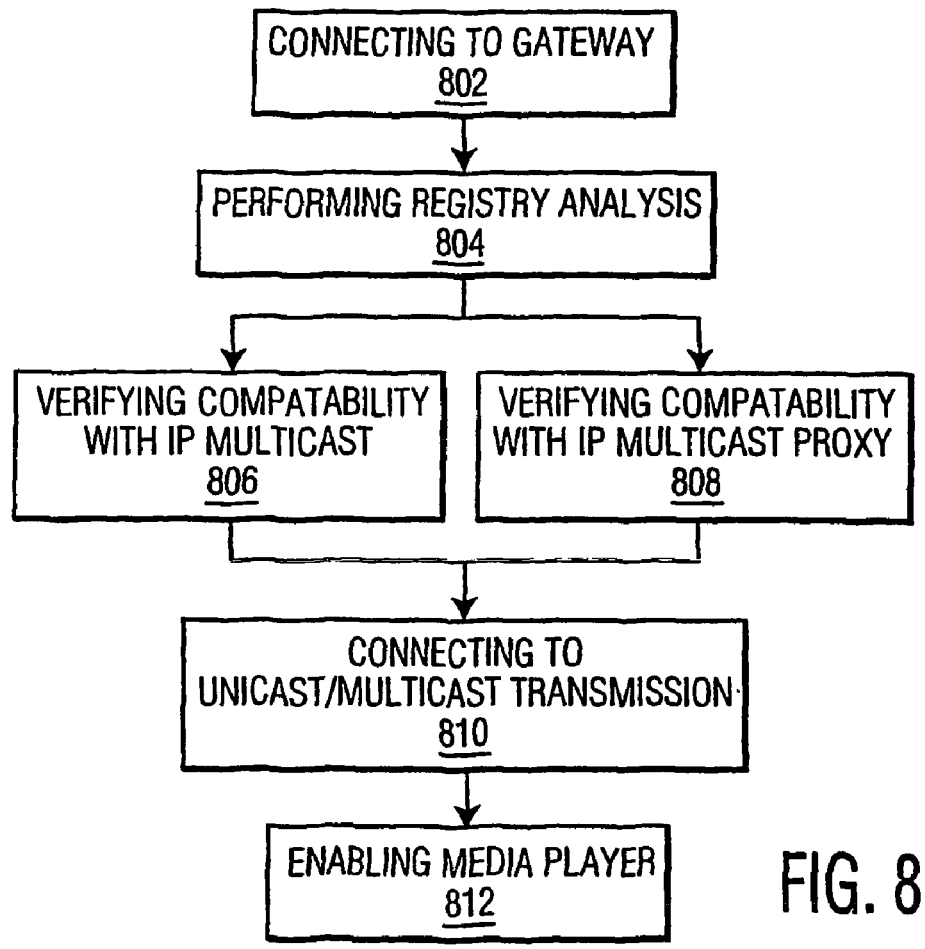
FIG. 8 is a block diagram of determining a user's capabilities of being bound to an IP multicast or an IP multicast proxy based transmission from an ad insertion system.

FIG. 8 shows a block diagram of a determining a user's capabilities of being bound to an IP multicast or an IP multicast proxy (IP casting service) based transmission from an ad insertion system. Specifically, the block diagram displays an interaction between user 32 and gateway 710. In step 802, a user 32 connects to gateway 710 through a communications network (Internet 34) in a manner consistent with the invention described above.

Step. 804 has gateway 710 performing a registry analysis on a communications transmission interface used by user 32 to access gateway 802. A communications interface, in this example, is a browser or other type of interface that provides a user the means to receive a streaming media broadcast via Internet 34. The registry analysis focuses on ascertaining if the communication interface supports IP multicasting, IP multicasting proxy, and/or unicasting (casting services), methods of transferring data packets over a network as the Internet 34.

When transferring information (for example, streaming media) to a client (user 32) from a server (ad insertion system 30) through the Internet 34, the information, transmitted in the form in data packets, may be sent directly to the destination or IP address of the client. This direct transmission is known as IP unicasting or a point-to-point transmission, where the client is the only terminating point of the transmission. IP unicasting becomes inefficient when plurality of clients request the same information from a server, because the amount of bandwidth required for the requests equals the total number of clients multiplied by the size of the information requested.

The data requirements of IP unicasting are improved upon (reduced) by transmitting information via IP multicasting. When a plurality of clients request the same information from a server in a multicasting network implementation, the server preferably transmits one copy of the requested information to an router or IP switch means, which splits the requested information to support multiple clients sharing a group IP address, instead of transmitting multiple copies of the same information to multiple clients (as in IP unicasting). Preferably, IP multicasting uses MBONE, Sprint, Quest, or other type of IP multicasting based protocol standard.

IP multicasting proxy is a hybrid of IP multicasting and IP unicasting. When a plurality of clients request the same information from a server, the server (compatible with IP multicasting) transmits the information to a router or IP switch (as part of the Internet 34 connection between the server and clients). The communications interfaces of some clients may not support IP multicasting, which requires the router or IP switch to transmit information via IP unicasting to the clients. The router or IP switch also simultaneously IP multicasts information to the clients capable of receiving IP multicasts. IP multicast proxy is more efficient than using IP unicasting, but requires more bandwidth than IP multicasting for servicing the plurality of clients because part IP multicast proxy transmission are multicasted and unicasted. It should be noted that IP unicasting, IP multicasting, and IP multicasting proxy applies to communications between at least one of a user 32, ad insertion system 30, a router, IP switch, and a combination thereof.

The operation of step 804 entails the communications interface downloading a program (plug-in) from gateway 710 for performing a registry analysis. The program tests the communications interface with sample data to verify if the interface is compatible with IP multicasting (step 806) and if the interface is compatible with IP multicasting proxy (step 808). Specifically, the communications interface is tested in IP multicasting modes (multicast and multicast proxy) by transferring data or using Multipurpose Internet Mail Extensions (MIME) to request an IP multicasting mode, supported by a media decoder (REALAUDIO™, MEDIA PLAYER™, and MPEG compliant player). If the communications interface does support IP multicasting (step 806) and/or IP multicast proxy (step 808), the interface responses with a "true" command or flag (for example, transmitting "ACK" as an "acknowledgement"), a "false" command or flag is transmitted if the interface does not support IP multicasting (transmitting "NACK" as a "not acknowledged" command). Alternatively, the communications interface transmits predetermined information about whether it supports IP multicasting and/or IP multicasting proxy without the need for testing the interface with sample data.

In step 810, the gateway 710 uses the information received from the communications interface in determining if the communications interface supports IP unicasting, IP multicasting, and/or IP multicasting proxy in selecting a specific ad insertion system 30 to connect user 32. Optionally, the gateway 710 uses a demographic profile of a user 32, at least one network factor, and type of IP casting service in selecting a specific ad insertion system 30 for connecting and binding a user 32. Preferably, the gateway 710 hierarchically selects the IP casting service servers in the following order: IP multicasting server, IP multicasting proxy server, and IP unicasting.

Once a specific server is selected (selected system) from a plurality of ad insertion systems, gateway 710 communicates with the selected system to bind user 32 to an IP address or URI corresponding to user 32. Alternatively, the gateway 710 binds user 32 by routing the user 32 via Internet 34 to the selected ad insertion system 30 by use of IP addressing or redirection (for example, directing user 32 to the IP address or URI of the selected system). In step 812, the media player of user 32 is enabled, wherein the media player complies with the requirements of the determined server, including the type of media played, the encoded playback speed, and the type of broadcasting format used (IP multicasting/unicasting).

The present architecture represents one important aspect of the present invention. The present design allows for a highly scaleable architecture to support thousands of users simultaneously while maintaining a high quality of service. As well, the present architecture addresses a central problem of individualized broadcast: of being able to support a unique stream of broadcast in a point-to-point network, which is the nature of the Internet.

What is claimed is:

1. A system for selecting an ad insertion system from at least two ad insertion systems for receiving broadcast transmissions and inserted advertisements, the system comprising:
    a gateway device having at least one processor, said gateway device selects an ad insertion system from said at least two ad insertion systems in accordance with a client profile and at least one network factor associated with ad insertion system communication performance, wherein said client profile is a demographic profile associated with a client; and
    said gateway device receives information relating to said at least one network factor from at least one ad insertion system from said at least two ad insertion systems, wherein said at least one network factor is at least one of: responsiveness of a streaming media broadcast encoded at different playback speeds, responsiveness of said streaming media broadcast encoded at different bit rates, and delay in buffering said steaming media broadcast,
    wherein said gateway device ascertains that said client supports casting services that transfer data packets over a communications network, said casting services comprising at least one of: IP multicasting, IP multicasting proxy, and IP unicasting, and
    wherein said gateway device determines said selected ad insertion system in accordance with said casting services supported by said client.

2. The system of claim 1, wherein said gateway device is at least one of: a root server, a domain name server, a program server, a web server, a device supporting client services as a streaming media broadcast, and a program written in a browser complaint format.

3. The system of claim 2, wherein said gateway device resides in said at least one ad insertion system.

4. The system of claim 2, wherein said gateway device resides in an accessing means of said client, wherein said accessing means comprises at least one of: a browser, a personal computer with a modem, a set top box with a connection to the Internet, or an Internet enabled device with a network interface.

5. The system of claim 1, wherein said gateway device updates said inserted advertisements of said at least one ad insertion system.

6. A method for selecting an ad insertion system from at least two ad insertion systems for receiving broadcast transmissions and inserted advertisements, the method comprising:
    selecting, by a gateway device, an ad insertion system from said at least two ad insertion systems in accordance with a client profile and at least one network factor associated with ad insertion system communication performance, wherein said client profile is a demographic profile associated with a client;
    said gateway device receives information relating to said at least one network factor from at least one ad insertion system from said at least two ad insertion systems, wherein said at least one network factor is at least one of: responsiveness of a streaming media broadcast encoded at different playback speeds, responsiveness of said streaming media broadcast encoded at different bit rates, and delay in buffering said steaming media broadcast; and ascertaining that said client supports casting services that transfer data packets over a communications network, said casting services comprising at least one of: IP multicasting, IP multicasting proxy, and IP unicasting, wherein said determination of said selected ad insertion system uses information relating to said casting services supported by said client.

7. The method of claim 6, wherein said gateway device is at least one of: a root server, domain name server, program server, web server, device supporting a client services as a streaming media broadcast, and a program written in a browser complaint format.

8. The method of claim 6, wherein said gateway device resides in said at least one ad insertion system.

9. The method of claim 6, wherein said gateway device resides in an accessing means of said client, wherein said accessing means comprises at least one of: a browser, a personal computer with a modem, a set top box with a connection to the Internet, or an Internet enabled device with a network interface.

10. The system of claim 6, wherein said gateway device updates said inserted advertisements of said at least one ad insertion system.

* * * * *